(12) United States Patent
Fraser et al.

(10) Patent No.: US 6,172,135 B1
(45) Date of Patent: *Jan. 9, 2001

(54) IMPACT MODIFIED (METH) ACRYLIC POLYMERS

(75) Inventors: Ian Muir Fraser, Yarm; Jonathan Mark Treadgold, Stockton on Tees, both of (GB)

(73) Assignee: Imperial Chemical Industries PLC, London (GB)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

This patent is subject to a terminal disclaimer.

(21) Appl. No.: 08/952,425

(22) PCT Filed: May 23, 1996

(86) PCT No.: PCT/EP96/02216

§ 371 Date: Apr. 29, 1998

§ 102(e) Date: Apr. 9, 1998

(87) PCT Pub. No.: WO96/37531

PCT Pub. Date: Nov. 28, 1996

(30) Foreign Application Priority Data

May 24, 1995 (EP) .................................................. 95303525

(51) Int. Cl.$^7$ ............................ C08F 263/02; C08L 83/00
(52) U.S. Cl. ......................... 523/201; 523/202; 428/407; 525/307; 525/308; 525/309; 525/310; 525/316
(58) Field of Search ..................................... 523/200, 201, 523/202; 428/407; 525/307, 308, 309, 310, 316

(56) References Cited

FOREIGN PATENT DOCUMENTS

2039496 * 8/1980 (GB) .

* cited by examiner

*Primary Examiner*—James J. Seidleck
*Assistant Examiner*—U. K. Rajguru
(74) *Attorney, Agent, or Firm*—Pillsbury Madison & Sutro LLP

(57) ABSTRACT

A multistage core-shell particle consisting of a core, a first shell and optionally a second shell, substantially free from vinylically unsaturated compounds having at least two equally reactive double bonds, wherein: (i) the core contains a first (meth)acrylic polymer, (ii) the first shell contains a low Tg polymer comprising 0 to 25% by weight of a styrenic monomer and 75 to 100% by weight of a (meth)acrylic monomer, the (meth)acrylic monomer capable of forming a homopolymer having a glass transition temperature (Tg) in the range from −75 to −5 C, and which first shell represents more than 65% by volume of the combined volume of the core and first shell; (iii) the second shell, when present, contains a second (meth)acrylic polymer which may be the same or different from the first (meth)acrylic polymer, and (iv) the core and first shell together contain from 0.5 to 1.0% by weight of a graft-crosslinker. A composition and a polysiloxane-free moulded article containing residues obtainable from such core-shell particles. A method of forming a moulding article having improved impact resistance using an impact modifier formed from such core-shell particles.

21 Claims, No Drawings

IMPACT MODIFIED (METH) ACRYLIC POLYMERS

The present invention relates to impact modified (meth) acrylic polymers and articles formed therefrom.

(Meth)acrylic polymers, for example poly (methyl methacrylate), PMMA, are well known. However, such polymers are often relatively brittle, that is they are not resilient and have poor resistance to sudden impact, thereby limiting their general use.

Conventionally, to improve the impact resistance of such polymers, impact modifying polymers are blended with the (meth)acrylic polymer. These impact modifying polymers typically possess a Tg that is lower than that of the (meth) acrylic polymer and usually a Tg of less than 0° C.

Commonly, the impact modifying polymers are prepared and used in the form of so-called multistage core-shell particles. The multistage core-shell particles are blended, for example melt blended, with the (meth)acrylic polymer to form a composition containing about 40% by weight of the core-shell particles.

Extensive activity has centred on achieving the optimum configuration, that is the number and relative thickness of the core and of each shell, and also the composition of the core and of each shell in order to maximise the impact resistance of the resulting blend. Such configurations and compositions have increasingly become more sophisticated and complex thereby leading to increased difficulty and expense of manufacture of the core-shell particles and, hence, the resultant blends. Consequently, impact modified (meth)acrylic polymers are often only used for specialised applications where the need for their superior optical properties outweigh their general expense.

EP-A-0606636 teaches that, in order to achieve improved toughness over that provided for by the addition of an impact modifier in the form of a three stage core-shell, an (meth)acrylic polymer has to be blended with certain specific polysiloxanes. The three stage core-shell particles disclosed consist of an inner core of PMMA which is cross-linked with 1,4 butane diol dimethacrylate; a first shell of a copolymer consisting of 82% w/w of n-butyl acrylate and 18% w/w of styrene; and a second shell of PMMA. The inner core represents 15% w/w of the particle; the first shell 65% w/w of the particle; and the second shell 20% w/w of the particle. The core-shell particles are blended at a level of 40% w/w with a (meth)acrylic polymer. The (meth)acrylic polymer consists of a copolymer containing 99% w/w of methyl methacrylate and 1% w/w of methyl acrylate. The n-butyl acrylate/styrene copolymer content of the blend is calculated as 26% w/w. Improvements in notched impact resistance of up to about 38% are indicated as having been achieved by the additional use of the specified polysiloxanes to achieve a maximum notched impact value of 2.8 kJ.m$^{-2}$.

GB-A-2039496 is directed towards the preparation and use of a four stage core-shell particle. Typically, the inner core and second shell are a butyl acrylate/styrene copolymer containing 80% w/w of butyl acrylate, 18% w/w of styrene and 2% of allyl methacrylate graft cross-linker. Typically, the first shell is a methyl methacrylate/ethyl acrylate copolymer containing 94.6% w/w of methyl methacrylate, 5% w/w of ethyl acrylate and 0.4% w/w of allyl methacrylate. The third shell is a methyl metacrylate/ethyl acrylate copolymer containing 95% w/w of methyl methacrylate and 5% w/w of ethyl acrylate. The first and third shells together represent 25% w/w of the particle. Comparative examples show the preparation of a three stage core-shell particle. In the three stage core-shell particle the butyl acrylate/styrene copolymer core has been omitted so that the particles now have a methyl methacrylate/ethyl acrylate core and the methyl methacrylate/ethyl acrylate content of the particles is 25 to 35% w/w. It is shown that, when the particles are blended at a level of 50% with an (meth)acrylic polymer consisting of 95% w/w methyl methacrylate and 5% w/w ethyl acrylate thereby giving a butyl acrylate/styrene copolymer content in the blend of 37.5% w/w (using the four stage core-shell particles) and 27.5% w/w (using the three stage core-shell particles), the four stage core-shell particles gave rise to a 26% increase in impact toughness.

U.S. Pat. No. 5,286,801 teaches that the impact strength of an (meth)acrylic polymer, consisting of a copolymer containing 99% methyl methacrylate and 1% methyl acrylate, is improved by the use of a five stage core-shell particle in which the core, second shell and fourth shell are formed from a methyl methacrylate/ethyl acrylate copolymer containing 95.4 to 95.8% w/w methyl methacrylate, 3.9 to 4.6% w/w ethyl acrylate and 0 to 0.3% w/w allyl methacrylate; and the first and third shells are a n-butyl acrylate/styrene copolymer containing 80.4% w/w butyl acrylate, 17.6% w/w styrene and 2% w/w allyl methacrylate. The methyl methacrylate/ethyl acrylate copolymer representing 34.5% w/w of the total particle. Comparative examples relate to a three stage core-shell particle in which the core and second shell are formed from a methyl methacrylatelethyl acrylate copolymer containing 95.9 to 96% w/w methyl methacrylate, 4% w/w ethyl acrylate and 0 to 0.1% w/w allyl methacrylate; and the first shell is a n-butyl acrylate/styrene copolymer containing 80.4% w/w butyl acrylate, 17.6% w/w styrene and 2% w/w of allyl methacrylate. The methyl methacrylate/ethyl acrylate copolymer representing 35.5% w/w of the total particle. When blended at a level of 39% with an (meth)acrylic polymer, to give a n-butyl acrylate/styrene content of 25.5% w/w (using the five stage core-shell particles) and 25.2% w/w (using the three stage particles), the best five stage core-shell particles gave an unnotched Charpy Impact strength of 81 kJ.m$^{-2}$ which represented an increase of 19% over that achieved by the comparative three stage core particles.

A C Archer et al, Proceedings of the Churchill Conference on Deformation, Yield and Fracture of Polymers, Cambridge, April 1994, analysed the effect that the number of stages together with the size and content of each stage of various 2 to 4 stage core-shell particles had on the impact strength of (meth)acrylic polymers, as typified by a copolymer containing 92% mol/mol methyl methacrylate and 8% mol/mol butyl acrylate. The general conclusions were that the impact resistance of the blend increased rapidly with increasing volume fraction of n-butyl acrylate/styrene copolymer until the volume fraction was in the range 0.1 to 0.2. However, increasing the volume fraction above 0.2 caused a decrease in impact resistance.

Surprisingly, it has now been found that a three stage core-shell particle can be produced which when blended into a relatively brittle (meth)acrylic polymer can imbue the blend with a significantly higher impact resistance than that which has been hitherto achieved with conventional multi-stage core-shell particles in comparable blends.

Accordingly, in a first aspect, the present invention relates to a multistage core-shell particle consisting of a core, a first shell and optionally a second shell, substantially free from vinylically unsaturated compounds having at least two equally reactive double bonds, wherein
(i) the core contains a first (meth)acrylic polymer;
(ii) the first shell contains a low Tg polymer comprising 0 to 25% by weight of a styrenic monomer and 75 to 100% by weight of an (meth)acrylic monomer, the (meth)acrylic monomer capable of forming a homopolymer having a glass transition temperature (Tg) in the range from −75 to −5° C., and which first shell represents more than 65% by volume of the combined volume of the core and first shell;

(iii) the second shell, when present, contains a second (meth)acrylic polymer which may be the same or different from the first (meth)acrylic polymer; and (iv) the core and first shell together contain from 0.5 to 1.0% by weight of a graft-crosslinker.

In a second aspect, the present invention provides a composition comprising a matrix of a third (meth)acrylic polymer containing residues of core-shell particles obtainable from a plurality of multistage core-shell particles consisting of a, core, a first shell and optionally a second shell, substantially free from vinylically unsaturated compounds having at least two equally reactive double bonds, wherein (i) the core contains a first (meth)acrylic polymer;

(ii) the first shell contains a low Tg polymer comprising 0 to 25% by weight of a styrenic monomer and 75 to 100% by weight of an (meth)acrylic monomer, the (meth)acrylic monomer capable of forming a homopolymer having a glass transition temperature, Tg, in the range from −75 to −5° C., and which first shell represents more than 65% by volume of the combined volume of the core and first shell;

(iii) the second shell, when present, contains a second (meth)acrylic polymer which may be the same or different from the first (meth)acrylic polymer; and (iv) the core and first shell together contain from 0.5 to 1.0% by weight of a graft-crosslinker and in which composition the residues are substantially in the form of two-stage core-shell particles consisting of the core and the first shell.

In a third aspect, the present invention provides a method of forming a moulded article having improved impact resistance which method comprises melt blending a third (meth)acrylic polymer with sufficient of an impact modifier, consisting essentially of a plurality of multistage core-shell particles consisting of a core, a first shell and optionally a second shell, substantially free from vinylically unsaturated compounds having at least two equally reactive double bonds, wherein (i) the core contains a first (meth)acrylic polymer;

(ii) the first shell contains a low Tg polymer comprising 0 to 25% by weight of a styrenic monomer and 75 to 100% by weight of an (meth)acrylic monomer, the (meth)acrylic monomer capable of forming a homopolymer having a glass transition temperature, Tg, in the range from −75 to −5° C., and which first shell represents more than 65% by volume of the combined volume of the core and first shell;

(iii) the second shell, when present, contains a second (meth)acrylic polymer which may be the same or different from the first (meth)acrylic polymer; and (iv) the core and first shell together contain from 0.5 to 1.0% by weight of a graft-crosslinker;

to form an impact modified blend containing a volume fraction of the low Tg polymer of at least 0.225 and thereafter moulding the impact modified blend to form a moulded article having an unnotched Charpy Impact strength according to ISO 179-1982(E) of at least 50 kJ.m$^{-2}$.

In a fourth aspect, the present invention provides a moulded article formed from a composition, which is substantially free of polysiloxanes, comprising a matrix of a third (meth)acrylic polymer and which contains residues of core-shell particles obtainable from a plurality of multistage core-shell particles consisting of a core, a first shell and optionally a second shell, substantially free from vinylically unsaturated compounds having at least two equally reactive double bonds, wherein (i) the core contains a first (meth)acrylic polymer;

(ii) the first shell contains a low Tg polymer comprising 0 to 25% by weight of a styrenic monomer and 75 to 100% by weight of an (meth)acrylic monomer, the (meth)acrylic monomer capable of forming a homopolymer having a glass transition temperature, Tg, in the range from −75 to −5° C., and which first shell represents more than 65% by volume of the combined volume of the core and first shell;

(iii) the second shell, when present, contains a second (meth)acrylic polymer which may be the same or different from the first (meth)acrylic polymer; and (iv) the core and first shell together contain from 0.5 to 1.0% by weight of a graft-crosslinker and wherein the residues are substantially in the form of two-stage core-shell particles consisting of the core and the first shell and are present in sufficient a quantity that the moulded article has an unnotched Charpy Impact strength according to ISO 179-1982(E) of at least 50 kJ.m$^{-2}$.

The multistage core-shell particles are preferably spherical in appearance and have an overall diameter, which includes the optional second shell when present, in the range from 250 to 320 nm, and particularly from 270 to 300 nm. Generally, superior optical properties of moulded articles according to the fourth aspect of the present invention are obtained where the overall diameter is in the range from 240 to 260 nm, and particularly about 250 nm.

The core of the multistage core-shell particle preferably has a diameter in the range from 120 to 170 nm, particularly in the range from 120 to 130 nm.

Preferably, the first shell envelopes the core and has a relatively uniform thickness in the range from 50 to 80 nm, particularly in the range 50 to 60 nm, e.g. about 55 nm.

The combination of diameter of the core of the multistage core-shell and thickness of the first shell is chosen such that the first shell represents more than 65% by volume of the combined volume of the volume of the core and first shell. Preferably, the first shell represents at least 75%, particularly at least 80% and especially from 80 to 90%, e.g. about 85% by volume of the combined volume of the volume of the core and the first shell.

The optional second shell preferably envelopes the first shell and serves to improve the handling characteristics of the multistage core-shell particles when in the bulk. In particular the second shell, when present, acts to improve the flow characteristics of the particles.

The first (meth)acrylic polymer is preferably a relatively rigid (meth)acrylate polymer having a glass transition temperature of at least 20° C. Preferred polymers therefore include homopolymers of a monomer selected from $C_{1-4}$ alkyl methacrylate, i.e. methyl methacrylate, ethyl methacrylate, propyl methacrylate, butyl methacrylate; glycidyl methacrylate; isobomyl methacrylate; cyclohexyl methacrylate; copolymers containing at least one of the preceding monomers including such copolymers containing a minor proportion of an other monomer selected from at least one $C_{1-4}$ alkyl acrylate. Particularly preferred first (meth)acrylic polymers are copolymers containing 80 to 99% by weight of methyl methacrylate repeat units and 1 to 20% by weight of at least one $C_{1-4}$ alkyl acrylate, especially ethyl and/or butyl acrylate, repeat units. Especially preferred first (meth)acrylic polymers contain about 6% by weight of butyl acrylate which give rise to moulded articles having surprisingly high notched impact strengths.

The second and third (meth)acrylic polymers are preferably selected from the preferred polymers and copolymers of the first (meth)acrylic polymer. Further preferred is for the first and second (meth)acrylic polymers to be selected from the preferred polymers and copolymers. Especially preferred is for the first and second (meth)acrylic polymers to be the same preferred polymer or copolymer.

The (meth)acrylic monomer capable of forming a homopolymer having a glass transition temperature in the range −75 to −5° C. is suitably selected from at least one $C_{3-8}$ alkyl acrylate and/or at least one $C_{7-14}$ alkyl methacrylate. Preferably the (meth)acrylic monomer is capable of forming a homopolymer having a glass transition temperature in the range −65 to 31 10° C. and particularly in the range −65 to −15° C. Preferred (meth)acrylic monomers therefore include butyl acrylate and dodecyl methacrylate.

The styrenic monomer, when present, primarily aids in matching the refractive index of the core-shell particle with that of the third (meth)acrylic polymer. In the instance where such matching is not critical then the particular type and amount of styrenic polymer may vary considerably. However, when present, the styrenic monomer preferably constitutes from 14 to 26% by weight and particularly from 16 to 24% by weight of the polymer in the first shell.

Where refractive index matching is not critical, relatively low levels of styrenic monomer, e.g. below 14%, preferably from 5 to 10% w/w, can be used to improve the physical performance of moulded articles (as measured by Notched Izod and Unnotched Charpy) at relatively low temperatures, e.g. −20° C., although the physical performance at the conventional higher testing temperature, i.e. 23 ° C., is somewhat diminished.

Suitably, the styrenic monomer may be selected from styrene, alpha-methyl styrene, monochlorostyrene, butyl styrene, acrylonitrile and methacrylonitrile. Preferably the styrenic monomer is styrene.

The graft-crosslinker may be selected from the allyl and methallyl esters of acrylic or methacrylic acid. Preferably the graft-crosslinker is allyl methacyrlate. The graft-crosslinker may be present at the same percentage by weight in the core and first shell. Preferably, the core contains from 0.2 to 0.6% by weight of graft-crosslinker and the first shell contains from 0.8 to 1.2% by weight of graft-crosslinker. Further preferred is that the second shell, when present, does not contain any additional graft-crosslinker.

Although it is commonly viewed that other types of crosslinking agents, such as vinylically unsaturated compounds having at least two equally reactive double bonds, are equivalent to a graft-crosslinker in the present invention such crosslinking agents are not used. Hence, the multistage core-shell particles of the present are substantially free from such crosslinking agents.

The multistage core-shell particles of the present invention may be formed into compositions containing a third (meth)acrylic polymer, as hereinbefore defined. Typically, such compositions are formed by melt blending the core-shell particles with the third (meth)acrylic polymer. In order to achieve significant increases in impact toughness, the volume fraction of the low Tg polymer in the composition is at least 0.225, preferably at least 0.25 and particularly between 0.275 and 0.35. Notwithstanding that significant increases in impact toughness can be achieved, a further advantage of the multistage core-shell particles of the present invention is that conventional levels of impact strength can be achieved using lower amounts of core-shell particles.

Usually, during the formation of the composition, and in particular during the extrusion or moulding of the composition, any second shell that is initially present is stripped from the multistage core-shell particles. Thus, the residues of the multistage core-shell particles in the composition, whether or nor a second shell was initially present, are substantially of the form of two-stage core-shell particles consisting of the original core and first shell. These residues may be identified by applying a suitable stain to a sample of the composition such that the low Tg polymer is shown as a contrasting band against both the core and the third (meth)acrylic polymer. The volume fraction of the low Tg polymer may then be determined from the average thickness of the bands of stained polymer and the number of such bands within a known sampled area.

The compositions may then be used to form moulded articles. The moulded articles possess unnotched Charpy Impact strengths according to ISO 179-1982(E) of at least 50 $kJ.m^{-2}$, for example at least 60 $kJ.m^{-2}$, more typically greater than 70 $kJ.m^{-2}$, for example greater than 80 $kJ.m^{-2}$, and most usefully in the ranges 80 or 90 to 120 $kJ.m^{-2}$. Furthermore, such moulded articles can also show notched Izod strengths according to ISO 180A of at least 3 $kJ.m^{-2}$, for example at least 5 $kJ.m^{-2}$.

Additionally, when the first (meth)acrylic polymer, which constitutes the core of the multistage particles of the present invention, contains from about 4 to 8% w/w and in particular from about 4 to 6% w/w, e.g. about 6% w/w, of butyl acrylate is used then moulded articles can be prepared having notched Izod strengths according to ISO 180A of at least 7 $kJ.m^{-2}$, for example at least 8 $kJ.m^{-2}$, and more typically from 8 to 10 $kJ.m^{-2}$. Such compositions also show a surprising improvement on Instrument Falling Weight Impact according to ISO 6603/2 of from below 2 J for compositions containing less than 4% by weight to at least 3 J and particularly at least 3.5 J for compositions containing from 4 to 8% w/w of butyl acrylate. The foregoing improvements in the properties of the moulded articles are unexpected given that the core of the multistage particles is commonly not viewed as that part of the multistage particle which imbues the moulded article with improvements in such physical properties.

As when using conventional compositions, additives such as antioxidants and heat stabilisers may be incorporated with the compositions. However, other impact modifiers, in particular the polysiloxanes of the prior art are not necessary in order to achieve substantially improved impact strengths.

The present invention is further illustrated by reference to the following examples.

The multistage core-shell particles were prepared by emulsion polymerisation using the following general protocol.

Seed

Demineralised water (1900 cm3) was added to a 5 litre flask. Seed reagents containing methyl methacrylate monomer, butyl acrylate monomer, allyl methacrylate monomer and Aerosol-OT 75% obtainable from Cytec td were weighed into a glass bottle and then added to the flask. The flask was slowly purged with nitrogen and heated to achieve a stable temperature of 80° C. Potassium persulphate initiator was then added.

After 30 minutes, the seed stage was complete and a sample of approximately 0.5 cm3 was pipetted into 4 cm3 of demineralised water for subsequent particle size analysis.

Feed 1

During the seed stage, additional quantities of the reagents in the same proportions as previously used were weighed into a second glass bottle to form Feed 1.

After the seed stage, a further quantity of potassium persulphate initiator was added to the flask and thereafter Feed 1. The flask was continued to be held at 80° C.

After 15 minutes the polymerisation was compete and the core of the core-shell particle had been formed.

Feed 2

During the Feed 1 stage, the reagents required to form the first shell (butyl acrylate, monomer, styrene monomer, allyl methacrylate monomer and Aerosol-OT 75) were pre-weighed into a third glass bottle to form Feed 2.

An additional quantity of potassium persulphate initiator was then added to the flask containing the previously formed cores and thereafter Feed 2. As before, polymerisation was conducted at a temperature of 80° C. and was complete after 60 minutes to form the first shell of the core-shell particle.

Feed 3

After the Feed 2 stage, the reagents required to form the second shell (methyl methacrylate monomer and butyl acrylate monomer) were preweighed into a fourth glass bottle to form Feed 3.

A final quantity of potassium persulphate initiator was then added to the flask and thereafter Feed 3. The polymerisation was again conducted at 80° C. and was complete after 15 minutes thereby producing the desired core-shell particles in the form of a polymer latex.

Coagulation

In order to ease the handling of the core-shell particles, a coagulation stage was performed on the polymer latex.

A 10 liter flask was charged with 6 liters of demineralised water to which was added 100 g of magnesium sulphate heptahydrate. The contents were then heated to a temperature of 75° C. Whilst agitating the contents under high shear, the polymer latex at a temperature of 80° C. was poured into the flask. After addition of the latex, the contents were heated to a temperature of 95° C. and held at that temperature for 15 minutes so as to complete the coagulation process.

After coagulation, the polymer was allowed to cool to ambient temperature, for example overnight. The cooled polymer was then dried/washed by centrifugation followed by washing with 4 liters of demineralised water. The drying/washing process was repeated twice. After final centrifugation, the polymer was oven dried at a temperature of 80° C. for 24 hours.

Moulding

The dried coagulated polymer was then blended with an appropriate quantity of an injection moulding grade of a (meth)acrylic polymer, which is a copolymer containing 97% w/w of methyl methacrylate and 3% w/w of ethyl acrylate.

The resulting blend was then extruded into a lace on a "Clextral" twin screw extruder. A cutter was employed in line with the extruder so as to produce chips suitable for injection moulding.

The chips were injection moulded using a "Demag" toggle-lock machine into test pieces in the form of a HDT bar of dimensions 120 mm×10 mm×4 mm and a 4.5 inch (11.43 cm) diameter×3mm thick disc.

Testing

The HDT bar was used in determining the unnotched Charpy impact performance in a "Zwick" 5102 instrument so as to provide a span of 70 mm, and oriented such that the 4 mm edge was the strike face to receive an impact from a 4 J head.

The disc was used in an instrumentated falling weight impact test employing a dart of 12.7 mm falling at a speed of $3 m.s^{-1}$.

| Diameter of Core (nm) | 1st Shell Thickness (nm) | 1st Shell Content of Core-Shell Particle (% of Volume of Core and 1st Shell) | Graft-crosslinker in Core and 1st Shell is in Range 0.5–1.0% by Weight | 1st Shell Content of Blend (Volume Fraction) | Unnotched Charpy Impact $(kJ.m^{-2})$ | Notched Izod Impact $(kJ.m^{-2})$ |
|---|---|---|---|---|---|---|
| 232 | 8.5 | 19 | N | 0.11 | 11.9 | |
| 232 | 14 | 29 | N | 0.15 | 9.4 | |
| 219 | 15 | 32 | Y | 0.16 | 12.3 | |
| 254 | 19.5 | 35 | Y | 0.18 | 19 | |
| 227 | 19 | 37 | N | 0.19 | 19.1 | |
| 230 | 27.5 | 47 | Y | 0.23 | 24.3 | |
| 203 | 27 | 51 | N | 0.24 | 27.4 | |
| 197 | 28 | 53 | Y | 0.25 | 27.5 | |
| 191 | 28 | 54 | Y | 0.25 | 25.6 | |
| 208 | 31.5 | 55 | N | 0.25 | 14.7 | |
| 231 | 35 | 55 | N | 0.26 | 13.1 | |
| 228 | 37.5 | 57 | Y | 0.27 | 20.2 | |
| 195 | 33 | 58 | N | 0.27 | 29.1 | |
| 197 | 40 | 64 | N | 0.29 | 26.5 | |
| 194 | 48.5 | 70 | N | 0.31 | 26.4 | |
| 200 | 41.5 | 65 | Y | 0.29 | 83.6 | |
| 188 | 45.5 | 69 | Y | 0.3 | 86.6 | |
| 195 | 49.5 | 71 | Y | 0.31 | 97.6 | |
| 174 | 46 | 72 | Y | 0.31 | 92.8 | |
| 164 | 45 | 73 | Y | 0.31 | 111.6 | 5.99 |
| 195 | 56 | 74 | Y | 0.32 | 92.2 | |
| 198 | 59 | 75 | Y | 0.32 | 91.6 | |
| 184 | 55.5 | 76 | Y | 0.32 | 96.5 | |
| 188 | 59.5 | 77 | Y | 0.33 | 76.5 | |
| 159 | 53.5 | 79 | Y | 0.33 | 85 | |
| 175 | 60 | 79 | Y | 0.33 | 95.5 | |
| 190 | 66 | 79 | Y | 0.34 | 75.2 | |
| 157 | 56.5 | 80 | Y | 0.33 | 96 | |
| 183 | 68 | 81 | Y | 0.34 | 97.3 | |
| 149 | 55 | 81 | Y | 0.33 | 90.7 | 8.4 * |
| 150 | 55.5 | 81 | Y | 0.33 | 100 | |
| 139 | 53.5 | 82 | Y | 0.33 | 122.1 | 6.81 |
| 171 | 67 | 82 | Y | 0.34 | 99 | |
| 150 | 62 | 84 | Y | 0.34 | 100 | 8.13* |
| 159 | 66 | 84 | Y | 0.34 | 97.3 | |
| 147 | 61 | 84 | Y | 0.34 | 84.7 | |
| 150 | 67 | 85 | Y | 0.35 | 98.8 | |
| 149 | 64.5 | 85 | Y | 0.35 | 100 | |
| 170 | 73.5 | 85 | Y | 0.35 | 77.2 | |
| 154 | 70.5 | 86 | Y | 0.35 | 94.6 | |
| 152 | 74.5 | 87 | Y | 0.36 | 74.6 | |
| 147 | 86 | 90 | Y | 0.36 | 88 | |
| 109 | 98.5 | 95 | Y | 0.38 | 79.1 | 8.97* |
| 103 | 105 | 96 | Y | 0.38 | 84.1 | 9.28* |
| 108 | 105.5 | 96 | Y | 0.38 | 81.7 | |
| 95 | 106 | 97 | Y | 0.38 | 88.7 | 8.73* |

* - indicates the presence of 6% w/w in the first (meth)acrylic polymer

In a similar manner to the above, further multistage particles were prepared in which the proportion of butyl acrylate in the core and second shell was varied. The multistage particles had cores of about 126 nm in diameter, first shells of about 55 nm in thickness and second shells of about 7 nm in thickness. The first shell therefore represented about 85% by volume of the volume of the core and first shell. The multistage particles were then compounded at 40% by weight as before and the resulting blend used to prepare moulded specimens for testing. The results were as follows:

| % by Weight Butyl Acrylate | Falling Weight ISO 6603/2 (J) | Unnotched Charpy Impact (kJ.m$^{-2}$) | Notched Izod Impact (kJ.m$^{-2}$) |
|---|---|---|---|
| 0 | 1.9 | 53 | 4.2 |
| 1 | 1.4 | 68 | 7 |
| 4 | 4.9 | 82 | 8.3 |
| 6 | 3.7 | 75 | 7.5 |
| 8 | 4.6 | 82 | 7 |

In a similar manner to the above, further multistage particles were prepared having the following composition and dimensions.

| Stage | Composition (% w/w) | | | | Diameter (nm) |
|---|---|---|---|---|---|
| | Methyl Methacrylate | Butyl Methacrylate | Allyl Methacrylate | Styrene | |
| Core | 93.5 | 6 | 0.5 | 0 | 148 |
| First Shell | 0 | 90 | 1 | 9 | 275 |
| Second Shell | 93.9 | 6.1 | 0 | 0 | 303 |

These were then blended as before at 40% by weight and the blend used to prepare specimens for testing. The results of the tests are below and are compared with results obtained from using multistage particles (still within the scope of the present invention) wherein the amount of styrene in the first shell was increased to 18% and the amount of butyl acrylate reduced accordingly.

| | 9% Styrene in First Shell | | 18% Styrene in First Shell | |
|---|---|---|---|---|
| Test Temperature | 23° C. | −20° C. | 23° C. | −20° C. |
| Notched Izod (kJ.m$^{-2}$) | 5.6 | 4.2 | 9.1 | 3.8 |
| Unnotched Charpy (kJ.m$^{-2}$) | 77 | 70 | 80 | 57 |

It can therefore be seen that reducing the amount of styrene in the first shell improves the low temperature characteristics of moulded articles.

What is claimed is:

1. A multistage core-shell particle substantially free from vinylically unsaturated compounds having at least two equally reactive double bonds consisting of a core and a first shell, wherein
   (i) the core contains a first (meth)acrylic polymer;
   (ii) the first shell contains a low Tg polymer comprising 0 to 25% by weight of a styrenic monomer and 75 to 100% by weight of an (meth)acrylic monomer, the (meth)acrylic monomer capable of forming a homopolymer having a glass transition temperature (Tg) in the range from −75 to −5° C., and which first shell represents more than 65% by volume of the combined volume of the core and first shell;
   (iii) the core and first shell together contain from 0.5 to 1.0% by weight of a graft-crosslinker.

2. A multistage core-shell particle as claimed in claim 1 wherein the first (meth)acrylic polymer is a copolymer containing from 80 to 99% by weight of methyl methacrylate repeat units and from 1 to 20% by weight of at least one $C_{1-4}$ alkyl acrylate repeat units.

3. A multistage core-shell particle as claimed in claim 2 wherein the first (meth)acrylic polymer contains about 6% by weight of butyl acrylate repeat units.

4. A multistage core-shell particle as claimed in claim 1 wherein the (meth)acrylic monomer capable of forming a homopolymer having a glass transition temperature in the range −75 to −5° C. is selected from at least one $C_{3-8}$ alkyl acrylate and at least one $C_{7-14}$ alkyl methacrylate.

5. A multistage core-shell particle as claimed in claim 4 wherein the (meth)acrylic monomer is at least one of butyl acrylate and dodecyl methacrylate.

6. A multistage core-shell particle as claimed in claim 1 wherein the styrenic monomer is present and constitutes from 14 to 26% by weight of the polymer in the first shell.

7. A multistage core-shell particle as claimed claim 1 wherein the core contains from 0.2 to 0.6% by weight of a graft-crosslinker and the first shell contains from 0.8 to 1.2% by weight of the graft-crosslinker.

8. A composition comprising a matrix of a third (meth) acrylic polymer containing residues of core-shell particles obtainable from a plurality of multistage core-shell particles as defined in claim 1 and in which composition the residues are substantially in the form of two-stage core-shell particles consisting of the core and the first shell.

9. A method of forming a moulded article having improved impact resistance which method comprises melt blending a third (meth)acrylic polymer with sufficient of an impact modifier, consisting essentially of a plurality of multistage core-shell particles as defined in claim 1 to form an impact modified blend containing a volume fraction of the low Tg polymer of at least 0.225 and thereafter moulding the impact modified blend to form a moulded article having an unnotched Charpy Impact strength according to ISO 179-1982(E) of at least 50 kJ.m$^{-2}$.

10. A moulded article formed from a composition, which is substantially free of polysiloxanes, comprising a matrix of a third (meth)acrylic polymer and which contains residues of core-shell particles obtainable from a plurality of multistage core-shell particles as defined in claim 1 and wherein the residues are substantially in the form of two-stage core-shell particles consisting of the core and the first shell and are present in sufficient a quantity that the moulded article has an unnotched Charpy Impact strength according to ISO 179-1982(E) of at least 50 kJ.m$^{-2}$ and a notched Izod strength according to ISO 180A of at least 3 kJ.m$^{-2}$.

11. A multistage core-shell particle as claimed in claim 1 wherein the (meth)acrylic monomer capable of forming a homopolymer having a glass transition temperature in the range −75 to −5° C. is selected from at least one $C_{7-4}$ alkyl methacrylate.

12. A multistage core-shell particle substantially free from vinylically unsaturated compounds having at least two equally reactive double bonds consisting of a core, a first shell and a second shell wherein
   (i) the core contains a first (meth)acrylic polymer;
   (ii) the first shell contains a low Tg polymer comprising 0 to 25% by weight of a styrenic monomer and 75 to 100% by weight of an (meth)acrylic monomer, the (meth)acrylic monomer capable of forming a homopolymer having a glass transition temperature (Tg) in the range from −75 to −50° C., and which first shell represents more than 65% by volume of the combined volume of the core and first shell;

(iii) the second shell contains a second (meth)acrylic polymer which may be the same or different from the first (meth)acrylic polymer; and (iv) the core and first shell together contain from 0.5 to 1.0% by weight of a graft-crosslinker.

13. A multistage core-shell particle as claimed in claim 12 wherein the first (meth)acrylic polymer is a copolymer containing from 80 to 99% by weight of methyl methacrylate repeat units and from 1 to 20% by weight of at least one $C_{1-4}$ alkyl acrylate repeat units.

14. A multistage core-shell particle as claimed in claim 12 wherein the first (meth)acrylic polymer contains about 6% by weight of butyl acrylate repeat units.

15. A multistage core-shell particle as claimed in claim 12 wherein the (meth)acrylic monomer capable of forming a homopolymer having a glass transition temperature in the range −75 to −50° C. is selected from at least one $C_{3-8}$ alkyl acrylate and/or at least one $C_{7-14}$ alkyl methacrylate.

16. A multistage core-shell particle as claimed in claim 15 wherein the (meth)acrylic monomer is at least one of butyl acrylate and dodecyl methacrylate.

17. A multistage core-shell particle as claimed in claim 12 wherein the styrenic monomer is present and constitutes from 14 to 26% by weight of the polymer in the first shell.

18. A multistage core-shell particle as claimed in claim 12 wherein the core contains from 0.2 to 0.6% by weight of a graft-crosslinker and the first shell contains from 0.8 to 1.2% by weight of the graft-crosslinker.

19. A composition comprising a matrix of a third (meth) acrylic polymer containing residues of core-shell particles obtainable from a plurality of multistage core-shell particles as defined in claim 12 and in which composition the residues are substantially in the form of two-stage core-shell particles consisting of the core and the first shell.

20. A method of forming a molded article having improved impact resistance which method comprises melt blending a third (meth)acrylic polymer with sufficient of an impact modifier, consisting essentially of a plurality of multistage core-shell particles as defined in claim 12 from an impact modified blend containing a volume fraction of the low Tg polymer of at least 0.225 and thereafter molding the impact modified blend to form a molded article having an unnotched Charpy Impact strength according to ISO 179-1982(E) of at least 50 $kJ.m^{-2}$.

21. A molded article formed from a composition, which is substantially free of polysiloxanes,, comprising a matrix of a third (meth)acrylic polymer and which contains residues of core-shell particles obtainable from a plurality of multistage core-shell particles as defined in claim 12 and wherein the residues are substantially in the form of two-stage core-shell particles consisting of the core and the first shell and are present in sufficient a quantity that the molded article has an unnotched Charpy Impact strength according to ISO 179-1982(E) of at least 50 $kJ.m^{-2}$ and a notched Izod strength according to ISO 180A of at least 3 $kJ.m^{-2}$.

* * * * *